United States Patent
Shaw

(10) Patent No.: US 12,359,448 B2
(45) Date of Patent: *Jul. 15, 2025

(54) ARCHITECTURAL CONCRETE AND METHOD OF FORMING THE SAME

(71) Applicant: Shaw & Sons, Inc., Costa Mesa, CA (US)

(72) Inventor: Ronald D. Shaw, Costa Mesa, CA (US)

(73) Assignee: SHAW & SONS, INC., Costa Mesa, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 18/346,621

(22) Filed: Jul. 3, 2023

(65) Prior Publication Data
US 2023/0349172 A1    Nov. 2, 2023

Related U.S. Application Data

(63) Continuation of application No. 17/365,625, filed on Jul. 1, 2021, now abandoned, which is a continuation
(Continued)

(51) Int. Cl.
*B44F 7/00* (2006.01)
*B29C 39/14* (2006.01)
(Continued)

(52) U.S. Cl.
CPC .......... *E04F 15/126* (2013.01); *B29C 39/146* (2013.01); *E04C 2/044* (2013.01);
(Continued)

(58) Field of Classification Search
CPC ...... E04F 15/126; B29C 39/146; E04C 2/044; E04C 2/06; B29L 2009/00
See application file for complete search history.

(56) References Cited

U.S. PATENT DOCUMENTS

| 348,443 A | 8/1886 | Anderson |
| 712,168 A | 10/1902 | Worth |

(Continued)

FOREIGN PATENT DOCUMENTS

WO    8501690 A1    4/1985

OTHER PUBLICATIONS

WWW.CEMENT.ORG, "Placing & Finishing Concrete", 4 pgs. (Dec. 13, 2003).
(Continued)

*Primary Examiner* — Basil S Katcheves
(74) *Attorney, Agent, or Firm* — Stetina Garred Brucker & Newboles

(57) ABSTRACT

A method of forming an architectural concrete structure having a desired look (i.e., color) and texture, wherein the method generally includes pouring a base concrete layer using conventional concrete. A surface concrete mixture is prepared and includes a mixture of sand and small aggregates to give the surface concrete mixture the desired color and texture for the architectural concrete structure. The base concrete layer provides strength and durability to the concrete structure, while the surface concrete layer provides the desired look and texture of the concrete surface. The surface concrete mixture preferably includes small aggregates to create a smooth and uniform texture.

18 Claims, 2 Drawing Sheets

Related U.S. Application Data of application No. 16/774,821, filed on Jan. 28, 2020, now abandoned, which is a continuation of application No. 16/172,250, filed on Oct. 26, 2018, now Pat. No. 10,648,183, which is a continuation of application No. 15/619,275, filed on Jun. 9, 2017, now abandoned, which is a continuation of application No. 14/882,922, filed on Oct. 14, 2015, now Pat. No. 9,695,602, which is a continuation of application No. 13/971,706, filed on Aug. 20, 2013, now abandoned.

(51) Int. Cl.
| | |
|---|---|
| *E04C 2/04* | (2006.01) |
| *E04C 2/06* | (2006.01) |
| *E04F 15/12* | (2006.01) |
| *B29L 9/00* | (2006.01) |
| *B29L 31/00* | (2006.01) |

(52) U.S. Cl.
CPC ............. *E04C 2/06* (2013.01); *B29L 2009/00* (2013.01); *B29L 2031/776* (2013.01)

(56) References Cited

U.S. PATENT DOCUMENTS

| | | |
|---|---|---|
| 738,704 A | 9/1903 | Semmer |
| 745,068 A | 11/1903 | Menczarski |
| 763,064 A | 6/1904 | Mercer |
| 821,277 A | 5/1906 | Bellars |
| 828,031 A | 8/1906 | Kemper |
| 830,747 A | 9/1906 | Stauffer |
| 836,369 A | 11/1906 | Dexter |
| 958,194 A | 5/1910 | Thomas |
| 967,836 A | 8/1910 | Rodham |
| 969,435 A | 9/1910 | Adamson |
| 1,359,893 A | 11/1920 | Hopkins |
| 1,397,678 A | 11/1921 | De Paoli |
| 1,534,353 A | 4/1925 | Besser |
| 1,728,936 A | 9/1929 | Johnson |
| 2,021,210 A | 11/1935 | Thorn |
| 2,101,540 A | 12/1937 | Gullich |
| 2,172,629 A | 9/1939 | Treuhaft |
| 2,200,433 A | 5/1940 | Ripley |
| 2,275,272 A | 3/1942 | Scripture, Jr. |
| 2,277,203 A | 3/1942 | Louise |
| 2,296,453 A | 9/1942 | Saffert |
| 2,476,465 A | 7/1949 | Tarrant |
| 2,493,826 A | 1/1950 | Oelfke et al. |
| 2,746,465 A | 5/1956 | Farison |
| 2,907,129 A | 10/1959 | Bedell |
| 2,925,831 A | 2/1960 | Welty et al. |
| 2,931,751 A | 4/1960 | Robert |
| 3,161,442 A | 12/1964 | Reed |
| 3,305,991 A | 2/1967 | Weismann |
| 3,319,392 A | 5/1967 | Fitzgerald |
| 3,334,555 A | 8/1967 | Nagin et al. |
| 3,441,457 A | 4/1969 | Regnaud |
| 3,646,715 A | 3/1972 | Pope |
| 3,724,152 A | 4/1973 | Castellarin |
| 3,797,867 A | 3/1974 | Hartl |
| 3,815,824 A | 6/1974 | Olson |
| 3,874,140 A | 4/1975 | Seehusen |
| 4,070,849 A | 1/1978 | Digiacomo |
| 4,076,875 A | 2/1978 | Van Gasse |
| 4,115,976 A | 9/1978 | Rohrer |
| 4,146,599 A | 3/1979 | Lanzetta |
| 4,205,040 A | 5/1980 | Aoyama et al. |
| 4,270,789 A | 6/1981 | Cline |
| 4,281,496 A | 8/1981 | Danielsson |
| 4,443,496 A | 4/1984 | Obitsu et al. |
| 4,496,504 A | 1/1985 | Steenson et al. |
| 4,542,040 A | 9/1985 | Nowak |
| 4,646,482 A | 3/1987 | Chitjian |
| 4,662,972 A | 5/1987 | Thompson |
| 4,697,951 A | 10/1987 | Allen |
| 4,714,507 A | 12/1987 | Ohgushi |
| 4,748,788 A | 6/1988 | Shaw et al. |
| 4,841,702 A | 6/1989 | Huettemann |
| 4,915,888 A | 4/1990 | Sato |
| 4,947,600 A | 8/1990 | Porter |
| 5,010,982 A | 4/1991 | Sedlmayr |
| 5,024,029 A | 6/1991 | Abbott et al. |
| 5,114,475 A | 5/1992 | Siegmund et al. |
| 5,226,279 A | 7/1993 | Rendon-Herrero |
| 5,234,128 A | 8/1993 | Hill |
| 5,246,650 A | 9/1993 | Clark |
| 5,395,673 A | 3/1995 | Hunt |
| 5,441,677 A | 8/1995 | Phillips, Sr. |
| 5,494,729 A | 2/1996 | Henry et al. |
| 5,645,664 A | 7/1997 | Clyne |
| 5,673,489 A | 10/1997 | Robell |
| 5,794,401 A | 8/1998 | Shaw et al. |
| 5,795,108 A | 8/1998 | Lightle |
| 5,887,399 A | 3/1999 | Shaw et al. |
| 5,950,394 A | 9/1999 | Shaw et al. |
| 6,016,635 A | 1/2000 | Shaw et al. |
| 6,033,146 A | 3/2000 | Shaw et al. |
| 6,082,074 A | 7/2000 | Shaw et al. |
| 6,112,487 A | 9/2000 | Shaw et al. |
| 6,164,037 A | 12/2000 | Passeno |
| 6,330,774 B1 | 12/2001 | Weinstein |
| 6,444,077 B1 | 9/2002 | Fennessy |
| 6,568,146 B2 | 5/2003 | Harvey |
| 6,610,224 B2 | 8/2003 | Sullivan |
| 6,779,945 B2 | 8/2004 | Saffo |
| 6,780,369 B1 | 8/2004 | Darrow et al. |
| 6,785,992 B2 | 9/2004 | Chiarucci |
| 6,834,438 B1 | 12/2004 | Heister |
| 6,955,834 B2 | 10/2005 | Rohrbaugh et al. |
| 7,051,483 B2 | 5/2006 | Bamford |
| 7,066,680 B2 | 6/2006 | Wiley |
| 7,242,799 B1 | 7/2007 | Bremsteller |
| 7,322,772 B2 | 1/2008 | Shaw et al. |
| 7,493,732 B2 | 2/2009 | Brailsford et al. |
| 7,607,859 B2 | 10/2009 | Shaw et al. |
| 7,614,820 B2 | 11/2009 | Shaw et al. |
| 7,670,081 B2 | 3/2010 | Shaw et al. |
| 7,681,368 B1 | 3/2010 | Rubio |
| 9,695,602 B2 * | 7/2017 | Shaw .................... E04F 15/126 |
| 10,584,475 B1 | 3/2020 | Idd |
| 10,648,183 B2 * | 5/2020 | Shaw ..................... E04C 2/044 |
| 2003/0007836 A1 | 1/2003 | Clarke et al. |
| 2003/0061722 A1 | 4/2003 | Bradley |
| 2003/0140594 A1 | 7/2003 | Shaw et al. |
| 2003/0164753 A1 | 9/2003 | Gongolas |
| 2003/0227814 A1 | 12/2003 | Priesnitz et al. |
| 2004/0041295 A1 | 3/2004 | Shaw et al. |
| 2004/0118025 A1 | 6/2004 | Shalit |
| 2004/0197548 A1 | 10/2004 | Kopystecki |
| 2005/0140038 A1 | 6/2005 | Frienser |
| 2006/0083591 A1 | 4/2006 | Shaw et al. |
| 2007/0187873 A1 | 8/2007 | Bailey |
| 2015/0052842 A1 | 2/2015 | Shaw |
| 2015/0068146 A1 | 3/2015 | Dixon |
| 2017/0298626 A1 | 10/2017 | Shaw |
| 2021/0164226 A1 | 6/2021 | Cano |

OTHER PUBLICATIONS

Ardex, Inc., "Self-Leveling Toppings and Underlayments", 4 pgs. (1992).
Schwing America Inc., "Truck or Trailer Mounted Concrete Pump", 4 pgs. (1993).
L.M. Schofiled Company, "Lithotex Top Surface Retarder", 1985, 1 pg.
Concrete Construction, "Practical, Precise, and Profitable Concrete Production Systems", Aug. 1993, 1 pg.
Concrete Products, "Integral Color in Concrete", Apr. 1988, 5 pgs.
Journal of the American Concrete Institute, "Cement-Aggregate Reaction in Concrete", Oct. 1947, vol. 19, No. 2, 36 pgs.

(56) References Cited

OTHER PUBLICATIONS

Reed Publishing USA, "Speciality Concretes", Jun. 28, 1984, 6 pgs.

* cited by examiner

ARCHITECTURAL CONCRETE AND METHOD OF FORMING THE SAME

CROSS-REFERENCE TO RELATED APPLICATIONS

The present application is a continuation of U.S. patent application Ser. No. 17/365,625, filed Jul. 1, 2021, which is a continuation of U.S. patent application Ser. No. 16/774,821, filed Jan. 28, 2020, which is a continuation of U.S. patent application Ser. No. 16/172,250, filed Oct. 26, 2018, now U.S. Pat. No. 10,648,183, issued May 12, 2020, which is a continuation of U.S. patent application Ser. No. 15/619,275, filed Jun. 9, 2017, which is a continuation of U.S. patent application Ser. No. 14/882,922, filed Oct. 14, 2015, now U.S. Pat. No. 9,695,602, issued Jul. 4, 2017, which is a continuation of U.S. patent application Ser. No. 13/971,706, filed Aug. 20, 2013, the entire contents of which are expressly incorporated herein by reference

STATEMENT RE: FEDERALLY SPONSORED RESEARCH/DEVELOPMENT

Not Applicable

BACKGROUND

Technical Field of the Invention

The present invention relates generally to a method and finish for concrete structures, and more specifically to a method of forming architectural concrete structure having customized architectural attributes (i.e., color and texture), while at the same time exhibiting sufficient strength and durability.

Description of the Related Art

As is well known in the construction industry, concrete is a commonly used material for the fabrication of structures. The desirability of the use of concrete as a construction material is attributable to certain characteristics that concrete possesses in comparison to other construction materials. Due to its durability, wear resistance and cost economy, concrete is gaining widespread use in flooring applications. As a result of its widespread use, there is an increasing demand for variations in color and surface texture of the concrete such that the concrete possesses improved aesthetics similar to more conventional and costly flooring surfaces such as marble, stone and granite.

To meet the demand, the concrete industry has heretofore developed various coloring and surface finishing techniques for enhancing the aesthetics of the concrete. Exemplary finishing techniques include salt finishing, multiple brook finish, form press finish, and exposed aggregate finish.

In relation to exposed aggregate finishes, there are two commonly used techniques to achieve the desired finish, i.e., integrally exposed aggregate and surface seeded exposed aggregate. Integrally exposed aggregate tends to be the more conventional of the two methods and generally includes washing or removal of the surface cement and fines from the concrete while the concrete surface is still plastic, i.e., before full curing, such that the aggregate, normally rock or gravel, is left exposed on the surface of the concrete. Due to the normal size of such concrete aggregate being relatively large, as well as the washing process not being uniform in nature, the resultant concrete surface derived by the integrally exposed aggregate method is extremely rough and gagged, thereby limiting its widespread use in flooring applications.

Surface seeded exposed aggregate has been introduced, which subsequent to the pouring of the concrete, rock or gravel aggregate is broadcasted, i.e., seeded, over the top surface of the concrete and subsequently troweled into the same wherein upon curing the aggregate broadcast over the surface adheres to the surface and is thus exposed. Various sized aggregate can be broadcast over the surface of the concrete in the surface seeded exposed aggregate technique, normally the aggregate includes sheared or jagged edges such that the same can be worked into the surface of the concrete and be adequately adhered thereto. Thus, the resultant concrete surface, although generally flatter and not possessing as many surface irregularities as the integrally exposed aggregate surface, still possesses an extremely rough surface which limits its widespread use in flooring applications.

Therefore, there exists a substantial need in the art for an improved method of forming an architectural concrete surface having a surface which is smoother and more uniform than surfaces formed using existing techniques

BRIEF SUMMARY

There is provided a method of forming an architectural concrete structure having a prescribed look (i.e., color) and texture. The method generally includes pouring a base concrete layer using conventional concrete. A surface concrete mixture is prepared and includes a mixture of sand and small aggregates to give the surface concrete mixture the desired color and texture for the architectural concrete structure. The base concrete layer provides strength and durability to the concrete structure, while the surface concrete layer provides the desired look and texture of the concrete surface. The surface concrete mixture preferably includes small aggregates to create a smooth and uniform texture.

According to one embodiment, the method includes pouring a base concrete mixture in an unhydrated state to define a base concrete layer, wherein the base concrete mixture includes large aggregate. The method further includes preparing a surface concrete mixture including small aggregate and sand, wherein the small aggregate are smaller than the large aggregate used in the base concrete mixture. The small aggregate and sand are mixed to define a prescribed color. The surface concrete mixture is then poured over the base concrete layer while the base concrete mixture is in an unhydrated state, such that the surface concrete mixture defines a surface layer.

The method may further include the step of forming a subgrade upon which the base concrete mixture is poured. The method may additionally include providing a concrete form, and pouring the base concrete mixture within the concrete form. The surface of the base concrete layer may be leveled prior to pouring the surface concrete mixture over the base concrete layer. The method may further include the step of floating the surface concrete mixture after it is poured over the base concrete layer.

The surface concrete mixture may be finished after it is poured over the base concrete layer. The finishing step may include grinding the surface layer, etching the surface layer, and/or sand-blasting the surface layer.

The step of preparing the surface concrete mixture may include removing large aggregate from the base concrete mixture to form the surface concrete mixture.

The step of pouring the surface concrete mixture may include pneumatically projecting the surface concrete mixture over the base concrete layer.

The surface concrete mixture may be poured over the base concrete layer within eight hours after forming the base concrete layer.

According to another aspect of the present invention, there is provided an architectural concrete structure including a base concrete layer formed from a base concrete mixture including large aggregate, wherein the base concrete layer defining a base surface. A surface layer is formed on the base surface, wherein the surface layer includes small aggregate and sand. The small aggregates are smaller than the large aggregate in the base concrete mixture, and the small aggregate and sand being mixed to define a prescribed color. The surface layer is formed on the base surface while the base concrete mixture is in an unhydrated state to allow the surface layer to bond to the base concrete layer independent of a cold joint therebetween.

The present invention is best understood by reference to the following detailed description when read in conjunction with the accompanying drawings.

BRIEF DESCRIPTION OF THE DRAWINGS

These as well as other features of the present invention will become more apparent upon reference to the drawings wherein.

Common reference numerals are used throughout the drawings and detailed description to indicate like elements.

DETAILED DESCRIPTION

Figure 1:
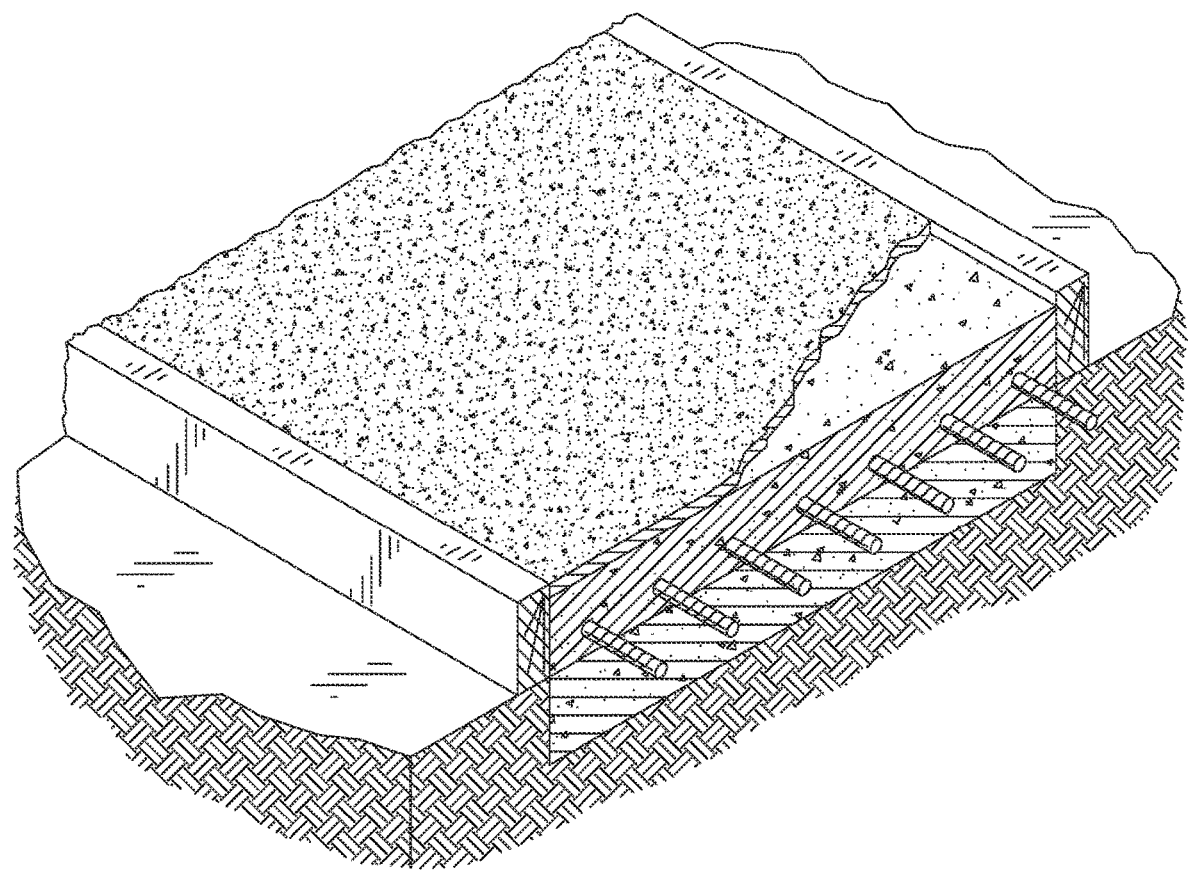
FIG. 1 is an upper perspective view of an embodiment of an architectural concrete structure formed in accordance with an embodiment of the present invention.

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Referring now to the drawings, wherein the showings are for purposes of illustrating a preferred embodiment of the present invention only, and are not for purposes of limiting the same, there is shown an architectural concrete structure 10 having a base concrete layer 12 and an outer surface concrete layer 14. According to various aspects of the present invention, the base concrete layer 12 is formed from conventional concrete, while the surface concrete layer 14 is customized to have prescribed architectural characteristics (i.e., color, texture, etc.). In order to ensure proper bonding/adhering between the base concrete layer 12 and the surface concrete layer 14, the surface concrete layer 14 is poured over the base concrete layer 12 while the base concrete layer 12 is in an unhydrated, plastic state, which allows the surface concrete layer 14 to bond to the base concrete layer 12 without a cold joint being formed therebetween.

As used herein, the term "architectural concrete structure" may be used to refer to patios, parking lots, decks, porches, walkways, flooring, garages, sidewalks, plazas, entryways, fountains, or other surfaces formed of concrete. Along these lines, architectural concrete structures provide desirable strength and durability which is derived from the concrete used to form the structure, while at the same time incorporating artistic design elements to achieve a preferred look and texture.

Figure 2:
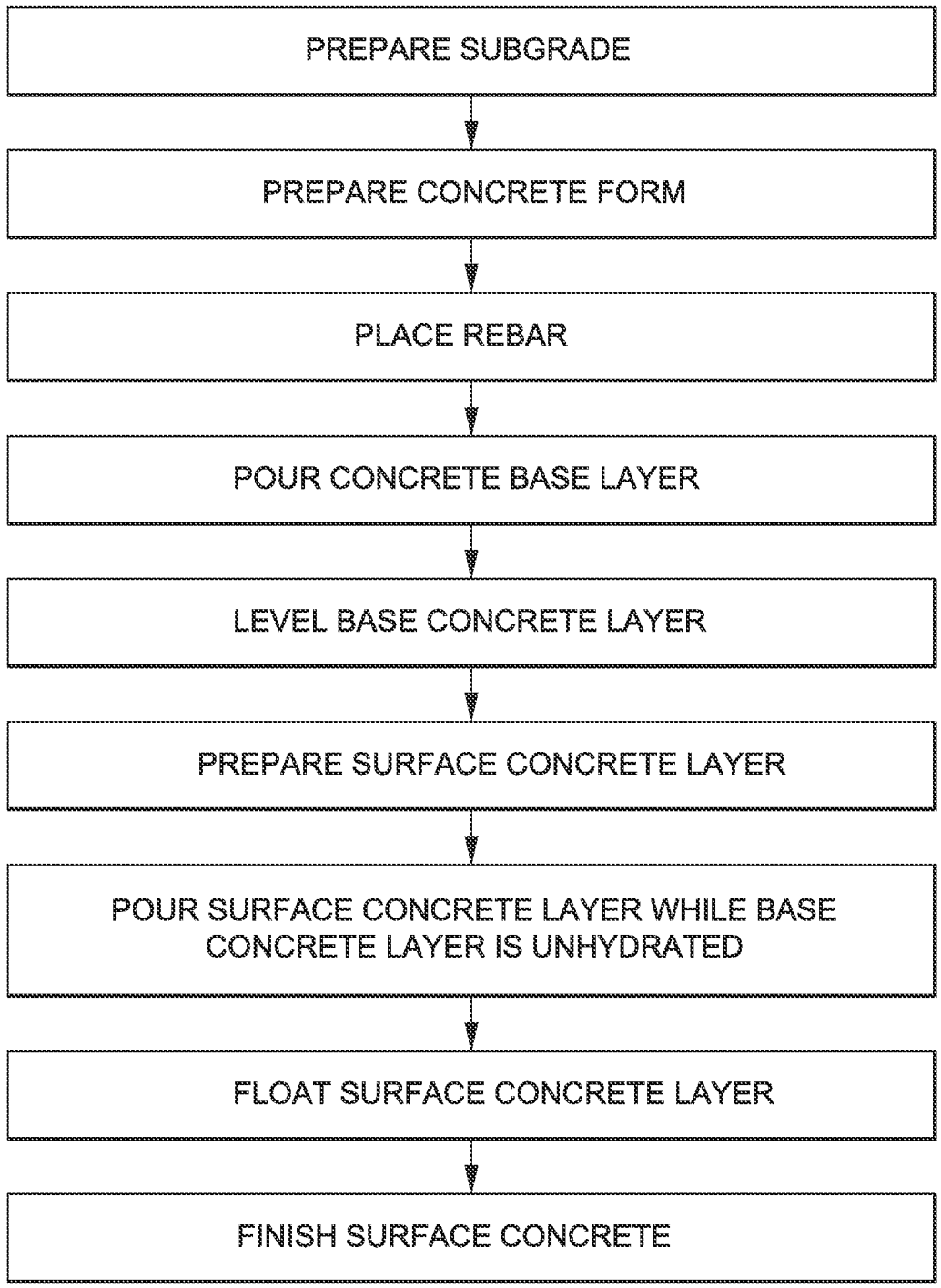
FIG. 2 is a flowchart of one embodiment of a method of forming the architectural concrete surface.

FIG. 2 is a flow chart illustrating one embodiment of a method of forming the architectural concrete structure. The method includes the step of preparing a subgrade 16 (see FIG. 1), which includes forming the subgrade 16 to a desired elevation and grade, and compacting the subgrade 16 to a proper compaction standard. Furthermore, any utilities (i.e., sleeve and pipes—not shown) that must extend under the architectural concrete structure 10 preferably extend under the subgrade 16.

The method further includes preparing and placing a form 18 on the subgrade 16. In general, the form 18 defines at least one edge of the architectural concrete structure 10, and may be constructed from wood or other materials known by those skilled in the art. In the exemplary embodiment depicted in FIG. 1, the form 18 includes two elongate members 20 (i.e., wood beams) positioned on the ground 22 adjacent the subgrade 16 to define a pour area for the concrete. The form 18 is preferably arranged to create a pour area having the specific dimensions required for the resultant architectural concrete structure 10. In the exemplary embodiment, the architectural concrete structure 10 is formed above-ground, and thus, the form 18 rests on the ground 22. However, in other embodiments, it may be desirable to form the architectural concrete structure 10 such that the top/exposed surface of the architectural concrete structure 10 is substantially flush with the ground level 22. In that case, the form 18 may extend at least partially below ground level to accommodate the designs of the architectural structure 10.

In order to increase the resultant strength of the structure 10 and reduce subsequent cracking of the same, reinforcement wire mesh or steel rebar 24 may be positioned above the subgrade 16 within the area defined by the form 18. In the exemplary embodiment, the concrete structure 10 includes a plurality of rebars 24 positioned longitudinally between the form members 20. Although the exemplary embodiment only shows rebars 24 arranged in a spaced, parallel arrangement, it is understood that other embodiments may include rebars 24 arranged in a lattice framework, which includes rebars 24 arranged in an intersecting fashion.

In addition to preparing the pour area for the architectural concrete structure 10, as noted above, the concrete used in forming the architectural structure 10 is also prepared. The preparation of the concrete may be performed before, during, or after preparation of the pour area.

The concrete used in forming the architectural concrete structure 10 includes a base concrete mixture 26 and a surface concrete mixture 28. The base concrete mixture 26 preferably includes cement, sand and aggregate, including small aggregate and large aggregate. As used herein, the term "small aggregate" will typically refer to aggregate preferably having a mean average diameter of less than three-eighths of one inch, while "large aggregate" will typically refer to aggregate preferably having a mean average diameter of greater than three-eighths of an inch. According to various embodiments, the base concrete mixture 26 may be prepared in a manner similar to conventional concrete.

Once the base concrete mixture 26 is prepared, the base concrete mixture 26 is preferably poured to a depth which covers any rebar 24 or reinforcement member placed within the pour area over the subgrade 16. After the base concrete layer 12 is poured, the base concrete layer 12 defines an exposed surface 30, which may be leveled after the base concrete mixture 26 is poured to define a generally smooth, planar surface.

The surface concrete mixture 28 is different from the base concrete mixture 26 and is used to form the exposed surface layer 14 of the architectural concrete structure 10. In this regard, surface concrete mixture 28 may include unique additives to achieve the desired look and texture of the architectural concrete structure 10. Along these lines, the preferred implementation of the surface concrete mixture 28 includes cement, select sands and small aggregates which create the desired look and texture of the architectural concrete structure 10. Along these lines, the sand and small aggregates mixed into the surface concrete mixture 28 may correlate to the prescribed color of the architectural structure 10 (i.e., if the desired color of the architectural structure 10 is red, then red sands and small aggregates are mixed into the surface concrete mixture 28). The selected sands and small aggregates may not only relate to the desired color of the architectural structure 10, but may also relate to the reflective qualities (i.e., dull or polished) or other aesthetic characteristics of the architectural structure 10 known by those skilled in the art.

Once the surface concrete mixture 28 is prepared, it is poured over the exposed surface 30 of the base concrete layer 12 while the base concrete mixture 26 is in an unhydrated, plastic state. According to a preferred embodiment, the surface concrete layer 14 is approximately ¼" thick, wherein the thickness is defined as the distance between the upper exposed surface 32 of the surface concrete layer 14 and the interface of the surface concrete layer 14 and the base concrete layer 12. However, other embodiments may include a surface concrete layer that is more than ¼" thick or less than ¼" thick.

According to various embodiments of the present invention, the surface concrete mixture 28 is poured over the base concrete layer 12 within eight hours of forming the base concrete layer 12. Pouring the surface concrete mixture 28 over the base concrete layer 12 while the base concrete mixture 26 remains in an unhydrated, plastic state allows the surface concrete mixture 28 to bond to the base concrete mixture 26 and also prevents a cold joint from forming between the two layers 12, 14. This results in a more structurally uniform and sound concrete structure.

According to one embodiment, the surface concrete mixture 28 and the base concrete mixture 26 are formed as separate batches. As previously noted, the base concrete mixture 26 is formed similar to conventional concrete, and includes a mixture of cement, sand, large aggregate and small aggregate. On the other hand, the surface concrete mixture 28 includes cement, sand and small aggregates, wherein the sand and small aggregates are selectively added to the surface concrete mixture to define the desired look and texture of the structure 10.

According to another embodiment, the surface concrete mixture 28 is formed from the same batch as the base concrete mixture 26. There may be structural advantages associated with forming the surface concrete mixture 28 from the same batch as the base concrete mixture 26, such as having a degree of uniformity throughout the concrete structure 10. The surface concrete mixture 28 may be formed from the base concrete mixture batch by removing the large aggregates from the base concrete mixture batch, and then optionally adding sand and other small aggregates to achieve the desired look and texture for the surface concrete mixture 28.

After the surface concrete mixture 28 is poured over the base concrete layer 12, the surface concrete mixture 28 is floated to define a uniform outer surface. The surface concrete layer is then finished to reveal the color and texture of the surface mixture 28. For instance, the surface layer 14 may be ground, etched (acid etching or chemical etching), or sandblasted to reveal the color of the select sands and small aggregates mixed into the surface mixture 28.

The novel and unique concrete structure 10, and related method of forming the same described herein, uniquely includes a two-layer construction including the base concrete layer 12 and the surface concrete layer 14. The base concrete layer 12 provides structural support to the structure 10, while the surface concrete layer 14 provides aesthetic qualities to the structure 10. In this regard, the two-layer construction provides structural, as well as economic advantages when compared to a structure formed completely with concrete devoid of large aggregates. Along these lines, the use of large aggregates in the base mixture 26 strengthens the base mixture, and is also more advantageous from a cost perspective.

Additional modifications and improvements of the present invention may also be apparent to those of ordinary skill in the art. Thus, the particular combination of components and steps described and illustrated herein is intended to represent only certain embodiments of the present invention, and is not intended to serve as limitations of alternative devices and methods within the spirit and scope of the invention.

What is claimed is:

1. A method of forming architectural concrete, the method comprising the steps of:
    pouring a base concrete mixture to define a base concrete layer having an exposed upper outer surface, the base concrete mixture including cement and large aggregate;
    preparing a surface concrete mixture including cement, small aggregate, and sand, the small aggregate being smaller than the large aggregate used in the base concrete mixture, the small aggregate and sand being mixed into the surface concrete mixture to define a prescribed color; and
    pouring the surface concrete mixture over the exposed upper outer surface of the base concrete layer while the base concrete mixture is in an unhydrated state to enable bonding between the surface concrete mixture and the base concrete mixture, the surface concrete mixture defining a surface layer over the exposed base concrete layer.

2. The method recited in claim 1, further comprising the step of leveling the base concrete layer prior to pouring the surface concrete mixture.

3. The method recited in claim 1, further comprising the step of preparing the base concrete mixture.

4. The method recited in claim 3, wherein the step of preparing the surface concrete mixture includes removing large aggregate from the base concrete mixture to form the surface concrete mixture.

5. The method recited in claim 1, further comprising the step of arranging rebar in a pour area, and wherein the step of pouring the base concrete mixture includes pouring the base concrete mixture over the arranged rebar.

6. The method recited in claim 1, wherein the step of preparing the surface concrete mixture includes adding sand to the cement and small aggregate such that the surface concrete mixture achieves an architectural characteristic associated with the sand.

7. The method recited in claim 1, wherein the surface concrete mixture is poured over the base concrete layer within eight hours after pouring the base concrete layer.

8. The method recited in claim 1, wherein the surface concrete mixture is prepared such that the surface concrete mixture is devoid of large aggregate.

9. The method recited in claim 1, further comprising the step of allowing the surface concrete mixture and the base concrete mixture to harden such that the surface concrete mixture becomes bonded to the base concrete mixture independent of a cold joint therebetween.

10. A method of forming an architectural concrete surface over a base concrete layer formed from cement and large aggregate, the method comprising:
preparing a surface concrete mixture including cement, sand, and small aggregate, the small aggregate being smaller than the large aggregate in the base concrete mixture, the small aggregate and sand being mixed into the surface concrete mixture to define a prescribed color; and
pouring the surface concrete mixture over the base concrete layer while at least a portion of the base concrete layer is in an unhydrated state to enable bonding between the surface concrete mixture and the base concrete mixture, the surface concrete mixture defining a surface layer.

11. The method recited in claim 10, further comprising the step of pouring the base concrete layer prior to pouring the surface concrete mixture.

12. The method recited in claim 11, wherein the surface concrete mixture is poured over the base concrete layer within eight hours after pouring the base concrete layer.

13. The method recited in claim 11, further comprising the step of leveling the base concrete layer prior to pouring the surface concrete mixture.

14. The method recited in claim 10, further comprising the step of preparing a base concrete mixture used to form the base concrete layer.

15. The method recited in claim 14, wherein the step of preparing the surface concrete mixture includes removing large aggregate from the base concrete mixture to form the surface concrete mixture.

16. The method recited in claim 10, wherein the step of preparing the surface concrete mixture includes adding sand to the cement and small aggregate such that the surface concrete mixture achieves an architectural characteristic associated with the sand.

17. The method recited in claim 10, wherein the surface concrete mixture is prepared such that the surface concrete mixture is devoid of large aggregate.

18. The method recited in claim 10, further comprising the step of allowing the surface concrete mixture and the base concrete mixture to harden such that the surface concrete mixture becomes bonded to the base concrete mixture independent of a cold joint therebetween.

* * * * *